United States Patent
Malek-Mohammadi et al.

(10) Patent No.: US 11,165,547 B2
(45) Date of Patent: Nov. 2, 2021

(54) TRANSMISSION TO MOVING RECEIVERS

(71) Applicant: Telefonaktiebolaget LM Ericsson (publ), Stockholm (SE)

(72) Inventors: Mohammadreza Malek-Mohammadi, Sollentuna (SE); Bo Lincoln, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/639,402

(22) PCT Filed: Aug. 18, 2017

(86) PCT No.: PCT/EP2017/070940
§ 371 (c)(1),
(2) Date: Feb. 14, 2020

(87) PCT Pub. No.: WO2019/034261
PCT Pub. Date: Feb. 21, 2019

(65) Prior Publication Data
US 2020/0259610 A1    Aug. 13, 2020

(51) Int. Cl.
| | |
|---|---|
| *H04L 5/00* | (2006.01) |
| *H04B 7/0456* | (2017.01) |
| *H04B 7/06* | (2006.01) |
| *H04L 25/02* | (2006.01) |

(52) U.S. Cl.
CPC ......... *H04L 5/0048* (2013.01); *H04B 7/0456* (2013.01); *H04B 7/0626* (2013.01); *H04L 5/0023* (2013.01); *H04L 25/023* (2013.01)

(58) Field of Classification Search
CPC ... H04L 5/0048; H04L 5/0023; H04L 25/023; H04L 25/02; H04B 7/0456; H04B 7/0626; H04B 7/04; H04B 7/06
See application file for complete search history.

(56) References Cited

U.S. PATENT DOCUMENTS

| | | | |
|---|---|---|---|
| 2011/0080961 A1 | 4/2011 | Hui et al. | |
| 2017/0099175 A1 | 4/2017 | Tian et al. | |
| 2017/0288834 A1* | 10/2017 | Yuan | ............ H04L 5/0069 |

(Continued)

FOREIGN PATENT DOCUMENTS

| | | |
|---|---|---|
| EP | 2963964 A1 | 1/2016 |
| WO | 2016155758 A1 | 10/2016 |

OTHER PUBLICATIONS

Chang, Dab-Chung, "Effect and Compensation of Symbol Timing Offset in OFDM Systems With Channel Interpolation", IEEE Transactions on Broadcasting, vol. 54, No. 4, Dec. 2008, pp. 761-770.

(Continued)

*Primary Examiner* — Sophia Vlahos
(74) *Attorney, Agent, or Firm* — Murphy, Bilak & Homiller, PLLC

(57) ABSTRACT

A reciprocity-based precoding algorithm is provided that accommodates for the specific type of uncertainty arising from the delay in channel estimation as a function of the velocity of moving wireless communication devices (103a-c). Account is taken of time delay from reference symbols previous sounding times as well as the velocity of the wireless communication devices (103a-c) thereby providing an effective precoding scheme for beamforming.

15 Claims, 4 Drawing Sheets

(56) References Cited

U.S. PATENT DOCUMENTS

2018/0198594 A1* 7/2018 Tiirola ................ H04W 74/006
2018/0288780 A1* 10/2018 Seyama ................ H04W 72/04

OTHER PUBLICATIONS

Papazafeiropoulos, K. Anastasios, "Impact of General Channel Aging Conditions on the Downlink Performance of Massive MIMO", May 24, 2016, pp. 1-15.

* cited by examiner

TRANSMISSION TO MOVING RECEIVERS

TECHNICAL FIELD

Embodiments herein relate to wireless communication and more specifically to controlling downlink transmission via a plurality of antennas to a plurality of wireless communication devices in a wireless communication system.

BACKGROUND

The wireless communication systems or networks of today, i.e. systems that provide communication services to wireless communication devices such as mobile phones, smartphones (often denoted by UE that is short for user equipment) as well as machine-type communication (MTC) devices, have evolved during the last decade into systems that must utilize the radio spectrum and other system resources in the most efficient manner possible. A reason for this is the ever increasing demand for high speed data communication capabilities in terms of, e.g., bitrate and a demand to provide these capabilities at any given time, at any geographical location to large numbers of wireless communication devices that may be moving with varying velocities.

To meet such demands, within for example the third generation partnership project (3GPP) work is being done regarding multi-user multiple-input multiple-output (MU-MIMO) communication. MU-MIMO communication is used for serving several wireless communication devices simultaneously with the same time and frequency resource in a wireless communication network. This technique, in which the network node, e.g. a radio base station in the form of an eNodeB in a 3GPP long term evolution (LTE) network, and/or the wireless communication devices are equipped with multiple antennas, allows for spatial diversity to transmit data in both uplink (UL) and downlink (DL) directions. The obtained spatial diversity increases the capacity of the network dramatically, or equivalently one can say that it offers a more efficient utilization of the frequency spectrum. Moreover, MU-MIMO can reduce the inter-cell interference which in turn, leads to more frequency re-use. As the electromagnetic spectrum is a rare resource, MU-MIMO is an important solution for the extension of the capacity of wireless communication systems.

A key point for effective deployment of the MU-MIMO communication technology is the access to accurate estimate of the channel responses between the radio base station (e.g. eNodeB) and the wireless communication devices in the associated network cell.

These channel responses include those in DL and UL transmissions and help to form the beam from the radio base station toward the intended wireless communication devices. The channel in the UL direction is usually estimated by sending a number of pilot symbols by the wireless communication devices to the radio base station (often called "sounding" and for example implemented as Sounding Reference Symbols in 3GPP LTE).

For a time division duplex (TDD) based system, it is possible to apply the physical channel reciprocity property and use the UL sounding and the associated channel estimation to obtain the DL channel estimates as well. The DL estimated channel, consequently, can be used to calculate precoding weights for beamforming in eNodeB. In fact, the reciprocity-based algorithms for beamforming in the downlink transmission are amongst the most successfully exploited algorithms in MU-MIMO and are predicted to be widely exploited in the fifth generation (5G) of cellular wireless communication networks. This class of algorithms is applicable whenever the so-called channel reciprocity property holds. More precisely, the channel should satisfy the condition that its responses in the uplink and downlink directions are the same up to a change in the role of the transmitter and receiver. This is usually true whenever a TDD scheme is used for multiplexing UL and DL transmissions. Applying this property, the estimated channel in the uplink direction is used for beamforming in the downlink transmission.

In summary, in a reciprocity-based beamforming, from the previously transmitted pilot symbols from the wireless communication devices to the radio base station, the UL channels are estimated, then these estimations will be valid in the DL direction by transposing the channel matrices. An example of such prior art beamforming can be found in the international patent application publication WO 2016/155758.

A common choice of period for channel sounding in the uplink direction, for example as is the case in 3GPP LTE, is on the order of 10 ms. As some of the outdoor wireless communication devices typically are moving, the channel response can considerably change for these wireless communication devices between the sounding times. In other words, the mobile communication network assumes that the channel response remains approximately unchanged for a period of 10 ms, while for the moving wireless communication devices, it actually changes. This problem results in inaccurately generated precoding weights by the radio base station, which leads to a significant performance loss in the capacity of the network. It can also cause more interference between wireless communication devices within a radio cell as well as interference associated with wireless communication devices and radio base stations of neighboring cells.

SUMMARY

In view of the above, an object of the present disclosure is to overcome or at least mitigate at least some of the drawbacks related to infrequent channel sounding in scenarios involving moving wireless communication devices.

This is achieved in a first aspect by a method performed by a network node for controlling downlink transmission via a plurality of antennas to a wireless communication device in a wireless communication system. The method comprises receiving uplink reference symbols transmitted by the wireless communication device at a sounding time. A channel response is estimated based on the received reference symbols. Determinations are then made of a plurality of uncertainty regions of the channel response at a corresponding plurality of time delays, subsequent to the sounding time, for transmissions on downlinks corresponding to the uplink in which the reference symbols are received. The uncertainty regions are based on an estimated velocity of the wireless communication device and based on assumed phase-only changes of the channel response. Calculation is then made of precoding weights for the downlink transmissions using the estimated uncertainty regions of the channel responses. Downlink signals are then transmitted to the wireless communication device, the transmitting comprising precoding using the calculated precoding weights.

In other words, a reciprocity-based precoding algorithm is provided that accommodates for the specific type of uncertainty arising from the delay in channel estimation as a function of the velocity of the wireless communication device. Account is taken of the time delay from a previous sounding time as well as the velocity of the wireless communication device thereby providing an effective precoding scheme for beamforming.

Advantages that are obtained are easily recognized when considering a plurality of wireless communication devices interacting with the network node according to the algorithm of the present disclosure. By updating precoding weights at time instants (i.e. at various time delays) corresponding to a plurality of transmissions, e.g. at every downlink sub-frame between time instants when uplink reference symbols are transmitted by the wireless communication devices, the throughput of the moving wireless communication devices increases considerably. This, in turn, leads to a higher network capacity gain over prior art systems where channel estimates are kept unchanged for all downlink transmissions until the next time reference symbols are received and the channel estimates can be updated. As a result of calculating precoding weights as summarized above, and thereby forming antenna beams more accurately towards the moving wireless communication devices, inter-cell and intra-cell interference will decrease. Furthermore, by enabling beamforming toward the wireless communication devices more accurately, less transmission power is needed for a given signal to noise ratio (SNR) at the receivers in the wireless communication devices. This reduces the power consumption in the network node.

The plurality of antennas may, in various embodiments, be mapped on a plurality of transmit ports. In such embodiments, the estimation of the uncertainty regions of the channel response and the calculation of precoding weights may comprise an assumption of statistically independent phase-only uncertainty per transmit port. In some of these embodiments, the calculation of precoding weights may comprise a minimum mean-squared error (MMSE) effective channel calculation for precoding weights based on an assumption of statistically independent phase-only uncertainty per transmit port.

The time delays may, in various embodiments, be calculated as the difference between a current downlink sub-frame transmission time and the sounding time.

In some embodiments, the time delays, $\Delta t$, subsequent to the sounding time, $t_0$, may be prior to a sounding time $t_1$ that is subsequent to the sounding time $t_0$.

In another aspect there is provided a network node configured to control downlink transmission via a plurality of antennas to a wireless communication device in a wireless communication system. The network node comprises radio frequency circuitry, a processor and a memory. The memory contains instructions executable by the processor whereby the network node is operative to:

receive uplink reference symbols transmitted by the wireless communication device at a sounding time, estimate a channel response based on the received reference symbols, determine a plurality of uncertainty regions of the channel response at a corresponding plurality of time delays, subsequent to the sounding time, for transmissions on downlinks corresponding to the uplink in which the reference symbols are received, the uncertainty regions being based on an estimated velocity of the wireless communication device and based on assumed phase-only changes of the channel response, calculate precoding weights, for the downlink transmissions using the estimated uncertainty regions of the channel responses, and transmit downlink signals to the wireless communication device, the transmitting comprising precoding using the calculated precoding weights.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 1:
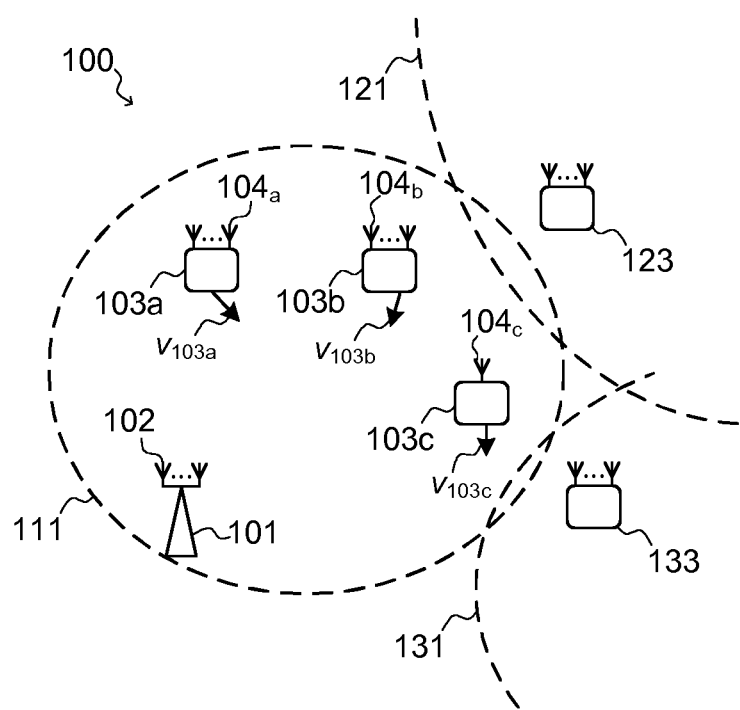
FIG. 1 schematically illustrates a wireless communication system.

A wireless communication system 100 in which the various embodiments of the present disclosure may be realized is schematically illustrated in FIG. 1. The wireless communication system 100 comprises a network node 101 and a plurality of wireless communication devices 103a-c, 123, 133. The network node 101 comprises a plurality of antennas 102 via which the network node 101 is configured to receive and transmit radio signals from and to at least the wireless communication devices 103a-c by respective uplink reception and downlink transmission. Illustrations of such up- and downlink are omitted in FIG. 1 for the sake of clarity of illustration and the skilled person will readily understand the present disclosure without such illustrations.

The wireless communication devices 103a-c, 123, 133 comprise one or more antennas 104a-c for transmission and reception of radio signals on up- and downlinks. At least some of the wireless communication devices 103a-c are moving with various velocities as exemplified by velocity vectors v 103a-c.

The wireless communication system 100 may be in the form of a 3GPP LTE system. In such a case, the network node 101 may represent an eNodeB. Needless to say, a 3GPP LTE system comprises many nodes in addition to such an eNodeB, for example a core network and gateways to other networks. However, since the present disclosure involves communication and algorithms associated only with the network node 101 that performs the actual radio signal exchange with wireless communication devices such as the wireless communication devices 103a-c, there is no need to illustrate further system nodes. As schematically illustrated by dashed lines in FIG. 1, in case the wireless communication system 100 is a 3GPP LTE system, the network node 101 maintains a first radio cell 111 with which the wireless communication devices 103a-c are associated. Wireless communication device 123 and wireless communication device 133 are associated with a second cell 121 and a third cell 131, respectively. The second cell 121 and the third cell 131 may be under the control of a respective network node, i.e. a respective eNodeB. However, such further eNodeB's are omitted from FIG. 1.

Although the following detailed description will use terminology mainly associated with a 3GPP LTE network, it is to be appreciated that the wireless communication system 100 may also be in the form of any other system that is capable of MU-MIMO communication between a network node and wireless communication devices. For example a 3GPP new radio (NR) system as well as an Institute of Electrical and Electronics Engineers (IEEE) 802.11 type of network. In case the wireless communication system 100 is an IEEE 802.11 type of network, wireless communication devices 103a-c, 123, 133 are all associated with the single network node 101, in which case the network node 101 is a so-called wireless access point.

Continuing with reference to FIG. 1, an example algorithm for calculating precoding weights will be described in some detail. The exemplifying algorithm involves a plurality of wireless communication devices and, as such, may define embodiments of a more generic method for controlling downlink transmission to a single wireless communication device as will be exemplified further below in connection with FIG. 3.

The exemplifying algorithm utilizes matrix algebra for simultaneous calculation of precoding weights for transmission on a plurality of downlinks to a corresponding plurality of wireless communication devices. However, it should be noted that the algorithm may be applied to any number, 1 ... p, of wireless communication devices.

Assuming that the network node 101 is an eNodeB equipped with n antennas 102 and p wireless communication devices 103a-c are active in the associated cell 111 and putting all the channel responses between the wireless communication devices 103a-c and eNodeB's 101 antennas 102, a channel matrix at time instant t can be generated as:

$$H(t)_{(pm)\times n} = \begin{bmatrix} h_{1,1}(t) & \ldots & h_{1,n}(t) \\ \vdots & \vdots & \vdots \\ h_{m,1}(t) & \ldots & h_{m,n}(t) \\ h_{(m+1),1}(t) & \ldots & h_{(m+1),n}(t) \\ \vdots & \ldots & \vdots \\ h_{(2m),1}(t) & \ldots & h_{(p-1)m+1),n}(t) \\ \vdots & \vdots & \vdots \\ h_{((p-1)m+1),1}(t) & \ldots & h_{((p-1)m+1),n}(t) \\ \vdots & \vdots & \vdots \\ h_{(pm),1}(t) & \ldots & h_{(pm),n}(t) \end{bmatrix} \quad (1)$$

where m denotes the number of antennas for each wireless communication device 103. In the above channel matrix, rows 1 to m, m+1 to 2m, ..., and (p-1)m+1 to pm denote the channel response complex coefficients associated to the first, second, ..., and pth wireless communication device 103, respectively.

Now, using a model in which the channel changes in time close to the latest UL sounding time are phase-only with reasonable precision; then, considering the phase-only change in the channel response in the subframes (i.e. at time instants of downlink transmission by the eNodeB 101) between the sounding times, the channel matrix at $t_0+\Delta t$, where $\Delta t$ denotes the delay from the previous sounding time $t_0$, is equal to $$H(t_0+\Delta t)=\delta(\Delta t)\odot H(t_0). \quad (2)$$

In equation (2), $\odot$ represents the element-wise multiplication and $\delta(\Delta t)$ denotes the phase change matrix with elements defined as $$[\delta(\Delta t)]_{i,k} = e^{j\Delta\phi_{i,k}(\Delta t)} \approx e^{j2\pi f_{\lceil\frac{i}{p}\rceil}\Delta t} \quad (3)$$

in which $\Delta\phi_{i,k}(\Delta t)$ designates the phase change for the (i,k)th element of H(t) and $$f_{\lceil\frac{i}{p}\rceil}$$

represents the Doppler shift between the $$\lceil\frac{i}{p}\rceil$$

th wireless communication device 103 and the eNodeB 101, where $$\lceil\frac{i}{p}\rceil$$

denotes the smallest integer greater than or equal to $$\frac{i}{p}.$$

Obviously, in the above formulation, $$f_{\lceil\frac{i}{p}\rceil}$$

is not a function of k, since the Doppler shift is the same across all the antennas 102 at the eNodeB 101 for a particular wireless communication device 103.

Figure 2A:
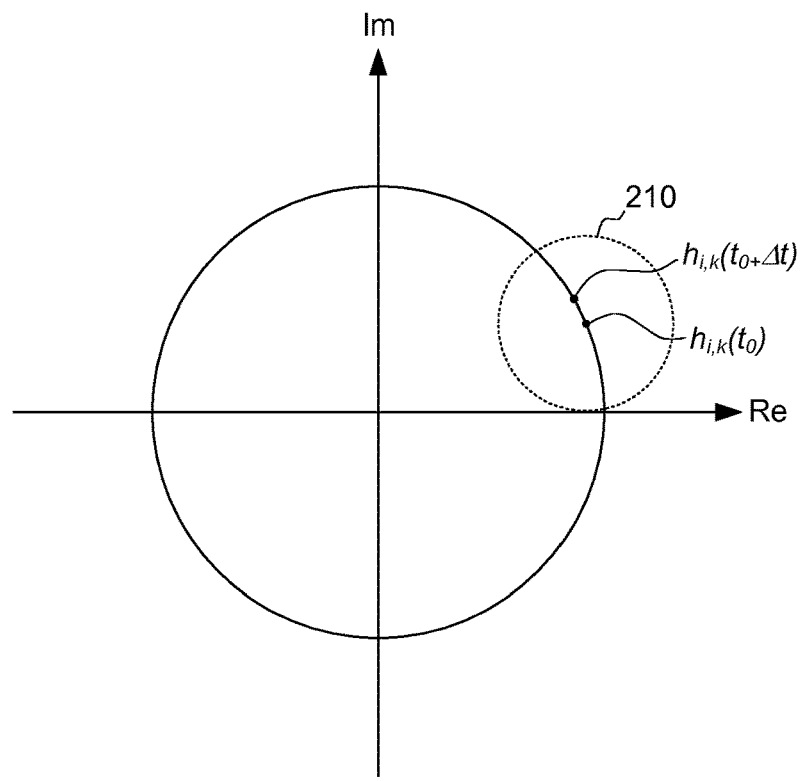
FIGS. 2a and 2b are diagrams illustrating channel responses.
Figure 2B:
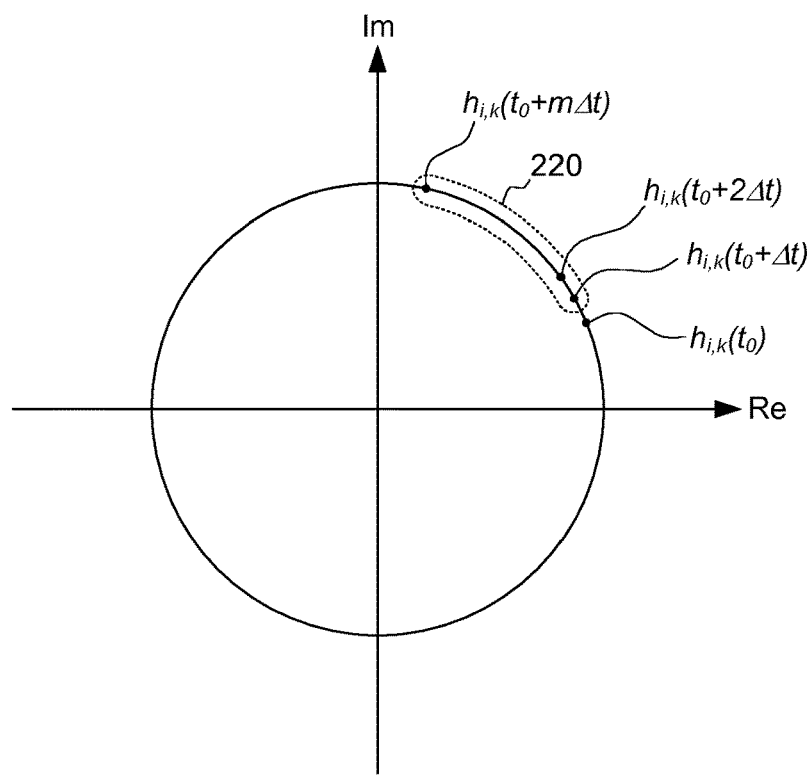

This modeling can be also interpreted as a way of shaping the uncertainty region around the previous estimate of the channel when time delay $\Delta t$ increases. For the sake of brevity, let us assume we are going to estimate $h_{i,k}$ from matrix H at time instant $t_0+\Delta t$, given the previous estimate at $t_0$. If we do not impose any constraint about the new value of $h_{i,k}$ except for being continuous with respect to time delay and having a similar bounded change in real and imaginary parts, then $h_{i,k}(t_0+\Delta t)$ will reside in a circle with some radius and centered at the previous value $h_{i,k}(t_0)$ in the complex plane. However, in our interpretation, we confine the set of possible values at time $t_0+\Delta t$ to be a skewed cloud over a circle which comes from the trajectory $h_{i,k}(t)$. This has been more clearly illustrated in FIGS. 2a and 2b. By shaping the uncertainty region, we can also expect a more accurate estimate of $h_{i,k}(t_0+\Delta t)$ since the area size of the uncertainty region decreases. As illustrated, the uncertainty ball around the previous estimate of the channel response is skewed over a circle. FIG. 2b shows the skewed ball 220, while FIG. 2a shows a circular uncertainty ball 210 with the only assumption that real and imaginary parts have the same maximum possible values.

Exploiting the true channel matrix in our channel estimation problem, one can write that $$H(t_0+\Delta t) = \delta(\Delta t) \odot \hat{H}(t_0) + \tilde{H}(\Delta t) \quad (4)$$

in which $\hat{H}(t_0)$ is the channel matrix estimated at the previous sounding time $t_0$ and $\tilde{H}(\Delta t)$ shows the error in the above channel update representation. For the sake of brevity, in the rest, we denote $H(t_0+\Delta t)$ as $H_{\Delta t}$, $\hat{H}(t_0)$ as $\hat{H}$, $\delta(\Delta t)$ as $\delta_{\Delta t}$, and $\tilde{H}(\Delta t)$ as $\tilde{H}$. We further assume that the Doppler shift $f_k$, $1 \le k \le p$, is uniformly distributed in $[-\tilde{f}_k, +\tilde{f}_k]$, where $\tilde{f}_k$ is the maximum possible Doppler shift for the kth wireless communication device 103a-c known from the maximum allowable speed of the wireless communication device 103a-c in the system 100 or from the reports given by the wireless communication device 103a-c. Moreover, it is assumed that $f_k$'s are statistically independent from each other. For the channel estimation error $\tilde{H}$, it is assumed that $\tilde{H}$ is wide-sense stationary random process with $\mathbb{E}\{\tilde{H}\}=0$, $\mathbb{E}\{\tilde{H}^H\tilde{H}\}=\Lambda$, where $\mathbb{E}\{\bullet\}$ denotes the expectation, 0 denotes a matrix with all elements equal to zero, $(.)^H$ represents the conjugate transpose of a matrix and $\Lambda$ is known e.g., from previous measurements. Furthermore, $\tilde{H}$ is assumed to be statistically independent from the matrix $\delta_{\Delta t}$.

To design a precoder at $t_0+\Delta t$, we rely on the minimum mean-squared error criterion. In particular, we need to solve the optimization problem $$\min_W \mathbb{E}\{\|H_{\Delta t}W - I\|_F^2\} \quad (5)$$

where the expectation is taken with respect to $\delta_{\Delta t}$ and $\tilde{H}$, $\|\bullet\|_F$ designates the Frobenius norm, and I represents the identity matrix. Solving the above optimization problem by applying the Karush-Kuhn-Tucker conditions, one can show that the optimal precoder equals $$W = (C_{\Delta t} + \Lambda)^{-1}(M_{\Delta t}^H \odot \hat{H}^H) \quad (6)$$

in which $C_{\Delta t} = \mathbb{E}\{(\delta_{\Delta t}^H \odot \hat{H}^H)(\delta_{\Delta t} \odot \hat{H})\}$ and $M_{\Delta t} = \mathbb{E}\{\delta_{\Delta t}\}$. Calculation of the newly introduced matrices is quite straightforward. It can be easily shown that the expected value of $e^{j2\pi f_k \Delta t}$ is equal to $$\mathbb{E}\{e^{j2\pi f_k \Delta t}\} = \frac{\sin 2\pi \tilde{f}_k \Delta t}{2\pi \tilde{f}_k \Delta t}; \quad (7)$$

thus, all the components in rows 1 to m of matrix $M_{\Delta t}$ will be equal to $$\frac{\sin 2\pi \tilde{f}_1 \Delta t}{2\pi \tilde{f}_1 \Delta t},$$

coming from the Doppler shift of the first wireless communication device 103, and all other rows will be set accordingly. In general, one can say that all entries in the ith row of $M_{\Delta t}$ equal $$\frac{\sin 2\pi \tilde{f}_{\lceil \frac{i}{p} \rceil} \Delta t}{2\pi \tilde{f}_{\lceil \frac{i}{p} \rceil} \Delta t}; \quad (8)$$

i.e., $[M_{\Delta t}]_{i,k} = \frac{\sin 2\pi \tilde{f}_{\lceil \frac{i}{p} \rceil} \Delta t}{2\pi \tilde{f}_{\lceil \frac{i}{p} \rceil} \Delta t}$.

Calculation of $C_{\Delta t}$ is a little bit trickier. To this end, we can first start from $$[C_{\Delta t}]_{i,k} = \sum_{l=1}^{pm} \mathbb{E}\{[\delta_{\Delta t}]^*_{l,i}[\delta_{\Delta t}]_{l,k}\}\hat{H}^*_{l,i}\hat{H}_{l,k} \quad (9)$$

where $(.)^*$ represents the complex conjugate. Consequently, the diagonal entries of $C_{\Delta t}$ will be equal to $$[C_{\Delta t}]_{i,i} = \sum_{l=1}^{pm}|\hat{H}_{l,i}|^2 \quad (10)$$

where we used $\mathbb{E}\{[\delta_{\Delta t}]^*_{l,i}[\delta_{\Delta t}]_{l,i}\}=1$. On the other hand, if $i \ne k$, we have $$[C_{\Delta t}]_{i,k} = \sum_{l=1}^{m}\left(\frac{\sin 2\pi \tilde{f}_1 \Delta t}{2\pi \tilde{f}_1 \Delta t}\right)^2 \hat{H}^*_{l,i}\hat{H}_{l,k} + \sum_{l=m+1}^{2m}\left(\frac{\sin 2\pi \tilde{f}_2 \Delta t}{2\pi \tilde{f}_2 \Delta t}\right)^2 \hat{H}^*_{l,i}\hat{H}_{l,k} + \quad (11)$$

$$\ldots + \sum_{l=(p-1)m+1}^{pm}\left(\frac{\sin 2\pi \tilde{f}_p \Delta t}{2\pi \tilde{f}_p \Delta t}\right)^2 \hat{H}^*_{l,i}\hat{H}_{l,k}$$

in which we used the fact that the Doppler shifts for distinct wireless communication devices 103a-c are statistically independent.

It is worthwhile to compare the proposed precoder with the precoder disclosed in WO 2016/155758. The precoder in WO 2016/155758 keeps the channel estimation in the subsequent subframes until getting a new estimate from a new sounding time. The MMSE precoder provided by WO 2016/155758 is $$W = (\hat{H}^H\hat{H} + \Lambda)^{-1}\hat{H}^H \quad (12)$$

It can be seen that the computational complexity of the precoder of the present disclosure, i.e. equation (1), is quite similar to that of the precoder of WO 2016/155758. In particular, calculation of $C_{\Delta t}$ is similar to calculation of $\hat{H}^H\hat{H}$ except for multiplication with p weights, $$\left(\frac{\sin 2\pi \tilde{f}_1 \Delta t}{2\pi \tilde{f}_1 \Delta t}\right)^2, \ldots, \left(\frac{\sin 2\pi \tilde{f}_p \Delta t}{2\pi \tilde{f}_p \Delta t}\right)^2,$$

which is computationally inexpensive. On the other hand, $\hat{H}^H$ is replaced by $M_{\Delta t}^H \odot \hat{H}^H$ in the formulation of the present disclosure. Since this is also introducing an element-by-element scaling, the computation burden does not change considerably.

Simulations in the form of numerical experiments have been made with wireless communication devices 103a-c with speed of 3, 10, and 20 km/h, applying the algorithm of the present disclosure to calculate precoder weights. The results showed that cell-edge normalized user throughput as a function of served traffic is significantly improved in terms of capacity of the network, especially when the served traffic is high. Moreover, another result of the numerical experiments is that the average transmitted power at the eNodeB 101 decreases when the algorithm of the present disclosure is applied.

Figure 3:
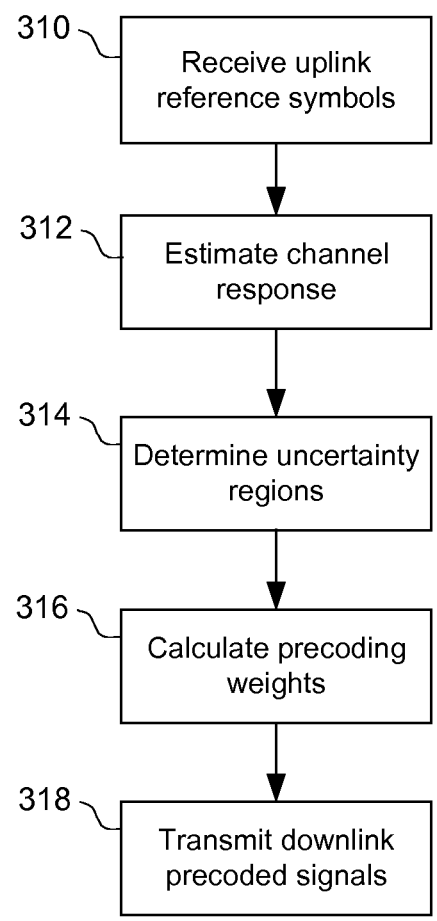
FIG. 3 is a flowchart of a method.

FIG. 3 is a flowchart that illustrates embodiments of a method performed by a network node 101 for controlling downlink transmission via a plurality of antennas 102 to a wireless communication device 103 in a wireless communication system 100. Any of the wireless communication devices 103a-c may be the referenced wireless communication device 103 with which the network node 101 communicates.

As pointed out above in connection with the description of the embodiments of the algorithm comprising equations (1)-(11), it is to be noted that the method to be described below will refer to a single wireless communication device 103. That is, the most general embodiments of the method illustrated in FIG. 3 are more generic embodiments of an algorithm for controlling downlink transmission via a plurality of antennas to a wireless communication device. Although the advantage of, e.g., increased throughput for a moving wireless communication device as mentioned above can be appreciated by such generic embodiments, it will be appreciated that even more increased throughput will be obtained when considering a multitude of wireless communication devices operating in a MU-MIMO scenario.

The method is described in terms of a number of actions performed by the network node 101 as follows:

Action 310

Reception of uplink reference symbols transmitted by the wireless communication device 103 at a sounding time, $t_0$.

For example, in embodiments wherein the wireless communication system 100 is 3GPP LTE system, the reference symbols transmitted by the wireless communication device 103 may be in the form of sounding reference symbols. In some embodiments, where the wireless communication system 100 is 3GPP NR system, the reference symbols transmitted by the wireless communication device 103 may be in the form of NR sounding reference symbols.

Action 312

Estimation of a channel response, h, based on the received reference symbols.

The channel response, h, corresponds to any one $h_{i,j}$ in the channel matrix H of equation (1). The actual channel estimation procedure that is performed in action 312, using the received reference symbols, may be any appropriate channel estimation procedure. A description of the actual procedure of estimating the channel response is outside the scope of this disclosure. The skilled person will apply general knowledge in order to make such an estimation.

Action 314

Determination of a plurality of uncertainty regions of the channel response, h, at a corresponding plurality of time delays, $\Delta t$, subsequent to the sounding time, $t_0$, for transmissions on downlinks corresponding to the uplink in which the reference symbols are received. The uncertainty regions are based on an estimated velocity $v_{103}$ of the wireless communication device 103 and based on assumed phase-only changes of the channel response, h.

Referring to the description of the algorithm above, the parts of the algorithm defined in equations (2)-(4) exemplifies how action 314 may be embodied.

For example, the time delays, $\Delta t$, may be calculated as the difference between a current downlink sub-frame transmission time and the sounding time, $t_0$.

In some embodiments, the time delays, $\Delta t$, subsequent to the sounding time, $t_0$, are prior to a sounding time $t_1$ that is subsequent to the sounding time $t_0$.

Furthermore, the estimated velocity $v_{103}$ of the wireless device 103 may be estimated from a Doppler shift of a radio frequency signal transmitted by the wireless communication device 103 and received by the network node (101). The velocity $v_{103}$ of the wireless device 103 may also be estimated from predetermined velocity information obtained by the network node 101. In fact, knowledge about how wireless communication devices are moving within a radio cell may be obtained from any appropriate source of information available to the network node 101.

Action 316

Calculation of precoding weights, W, for the downlink transmissions using the estimated uncertainty regions of the channel responses.

Referring to the description of the algorithm above, the parts of the algorithm defined in equations (5) and (6) exemplifies how action 316 may be embodied. That is, the matrices resulting from equations (2)-(4) and (7)-(11) are used in equations (5) and (6) to obtain a matrix of precoding weights, W.

Action 318

Transmission of downlink signals to the wireless communication device 103, the transmitting comprising precoding using the calculated precoding weights, W.

A description of the actual procedure of applying precoding on the downlink signals is outside the scope of this disclosure. The skilled person will apply general knowledge in order to precode the signals.

In some embodiments, the plurality of antennas 102 are mapped on a plurality of transmit ports. The determination in action 314 of the uncertainty regions of the channel response, h, and the calculation in action 316 of precoding weights, W, may in such embodiments comprise an assumption of statistically independent phase-only uncertainty per transmit port.

Mapping of ports to antennas, in its simplest form, is one by one, meaning that every antenna is mapped to one and only one certain port. However, other mappings are often used where more than one antenna is mapped into a port. This is known as virtualization in some wireless communication standards like LTE. With regard to the assumption, in these embodiments, of phase-only uncertainty per transmit port—since the radio channels are changing from the time of reference symbol transmission to the time of downlink transmission, it is advantageous to model the channels changes with an uncertainty model. In fact, during the $\Delta t$ time, the channels have already changed due to movement of the wireless communication device 103 or due to change in the surrounding geographical environment; the uncertainty model is advantageously entered into the algorithm.

As exemplified in the detailed description of the algorithm above, in some embodiments, the calculation in action 316 of precoding weights, W, may comprise a minimum mean-squared error, MMSE, effective channel calculation for precoding weights based on an assumption of statistically independent phase-only uncertainty per transmit port, i.e. equations (2) to (5).

Figure 4:
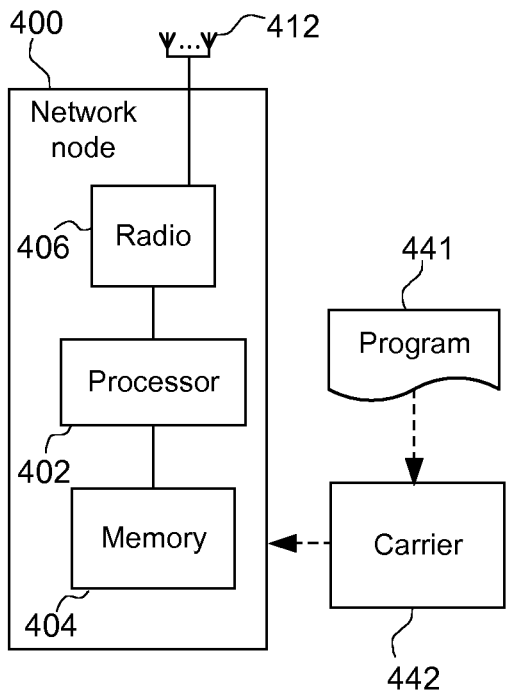
FIG. 4 is a schematically illustrated block diagram of a network node.

Turning now to FIG. 4, and with continued reference to FIG. 1, a schematically illustrated network node 400 will be described in some more detail. The network node 400, which may correspond to the network node 101 described above, is configured to control downlink transmission via a plurality of antennas 412 to a wireless communication device 103 in a wireless communication system 100, the network node 400 comprising radio frequency circuitry 406, a processor 402 and a memory 404, the memory 404 containing instructions executable by the processor 402 whereby the network node 400 is operative to:

receive uplink reference symbols transmitted by the wireless communication device 103 at a sounding time, $t_0$,
    estimate a channel response, h, based on the received reference symbols, determine a plurality of uncertainty regions of the channel response, h, at a corresponding plurality of time delays, Δt, subsequent to the sounding time, $t_0$, for transmissions on downlinks corresponding to the uplink in which the reference symbols are received, the uncertainty regions being based on an estimated velocity $v_{103}$ of the wireless communication device 103 and based on assumed phase-only changes of the channel response, h, calculate precoding weights, W, for the downlink transmissions using the estimated uncertainty regions of the channel responses, and transmit downlink signals to the wireless communication device 103, the transmitting comprising precoding using the calculated precoding weights, W.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the network node 400 is operative such that the plurality of antennas 102 are mapped on a plurality of transmit ports and operative such that:

the estimation of the uncertainty regions of the channel response, h, and the calculation of precoding weights, W, comprise an assumption of statistically independent phase-only uncertainty per transmit port.

In some embodiments, the network node 400 is operative such that:

the calculation of precoding weights, W, comprises a minimum mean-squared error, MMSE, effective channel calculation based on an assumption of statistically independent phase-only uncertainty per transmit port.

In some embodiments, the network node 400 is operative such that the time delays, Δt, are calculated as the difference between a current downlink sub-frame transmission time and the sounding time, $t_0$.

In some embodiments, the network node 400 is operative such that the time delays, Δt, subsequent to the sounding time, $t_0$, are prior to a sounding time $t_1$ that is subsequent to the sounding time $t_0$.

In some embodiments, the network node 400 is operative such that the velocity $v_{103}$ of the wireless device 103 is estimated from any of:

a Doppler shift of a radio frequency signal transmitted by the wireless communication device 103 and received by the network node 400, predetermined velocity information obtained by the network node 400.

In some embodiments, the network node 400 is operative in the wireless communication system 100 in the form of a third generation partnership project, 3GPP, long term evolution, LTE, system wherein the reference symbols transmitted by the wireless communication device 103 are sounding reference symbols, SRS. In some embodiments, the network node 400 is operative in the wireless communication system 100 in the form of a 3GPP new radio, NR, system wherein the reference symbols transmitted by the wireless communication device 103 are NR sounding reference symbols, NR SRS.

Figure 5:
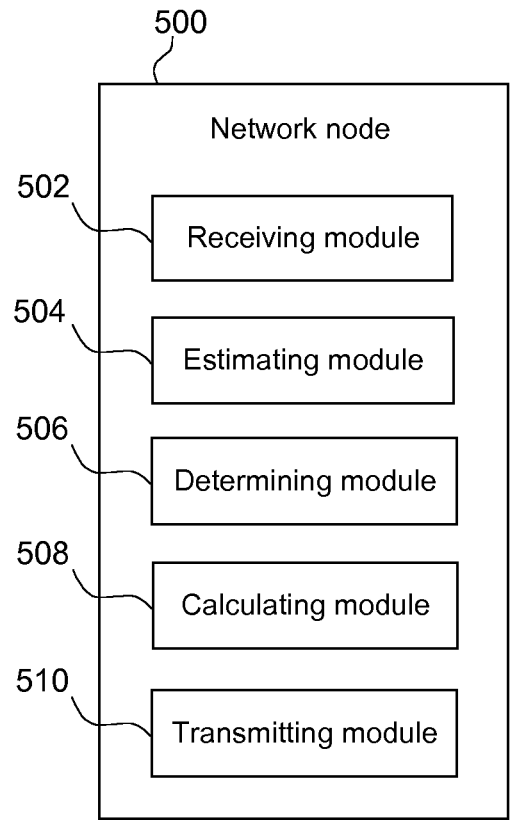
FIG. 5 is a schematically illustrated block diagram of a network node.

FIG. 5, illustrates schematically a network node 500 that comprises:

a receiving module 502 configured to receive uplink reference symbols transmitted by the wireless communication device (103) at a sounding time, $t_0$, an estimating module 504 configured to estimate a channel response, h, based on the received reference symbols, a determining module 506 configured to determine a plurality of uncertainty regions of the channel response, h, at a corresponding plurality of time delays, Δt, subsequent to the sounding time, $t_0$, for transmissions on downlinks corresponding to the uplink in which the reference symbols are received, the uncertainty regions being based on an estimated velocity $v_{103}$ of the wireless communication device 103 and based on assumed phase-only changes of the channel response, h, a calculating module 508 configured to calculate precoding weights, W, for the downlink transmissions using the estimated uncertainty regions of the channel responses, and a transmitting module 510 configured to transmit downlink signals to the wireless communication device, said transmitting comprising precoding using the calculated precoding weights, W.

The network node 500 may comprise further modules that are configured to perform in a similar manner as, e.g., the network node 400 described above in connection with FIG. 4.

The invention claimed is:

1. A method performed by a network node for controlling downlink transmission via a plurality of antennas to a wireless communication device in a wireless communication system, comprising:

receiving uplink reference symbols transmitted by the wireless communication device at a sounding time;

estimating a channel response based on the received reference symbols;

determining a plurality of uncertainty regions of the channel response at a corresponding plurality of time delays subsequent to the sounding time for transmissions on downlinks corresponding to the uplink in which the reference symbols are received, the uncertainty regions being based on an estimated velocity of the wireless communication device and based on assumed phase-only changes of the channel response;

calculating precoding weights for the downlink transmissions using the estimated uncertainty regions of the channel responses; and transmitting downlink signals to the wireless communication device, using the plurality of antennas, said transmitting comprising precoding using the calculated precoding weights.

2. The method of claim 1, wherein the plurality of antennas are mapped on a plurality of transmit ports and wherein:

the determination of the uncertainty regions of the channel response and the calculation of precoding weights comprise an assumption of statistically independent phase-only uncertainty per transmit port.

3. The method of claim 2, wherein:

the calculation of precoding weights comprises a minimum mean-squared error (MMSE) effective channel calculation based on an assumption of statistically independent phase-only uncertainty per transmit port.

4. The method of claim 1, wherein the time delays are calculated as the difference between a current downlink sub-frame transmission time and the sounding time.

5. The method of claim 1, wherein the time delays subsequent to the sounding time are prior to a second sounding time that is subsequent to the sounding time.

6. The method of claim 1, wherein the velocity of the wireless device is estimated from any of:
   a Doppler shift of a radio frequency signal transmitted by the wireless communication device and received by the network node; and
   predetermined velocity information obtained by the network node.

7. The method of claim 1, wherein the wireless communication system is any of:
   a third generation partnership project (3GPP) long term evolution (LTE) system wherein the reference symbols transmitted by the wireless communication device are sounding reference symbols (SRS); and
   a 3GPP new radio (NR) system wherein the reference symbols transmitted by the wireless communication device are NR sounding reference symbols (NR SRS).

8. A network node configured to control downlink transmission via a plurality of antennas to a wireless communication device in a wireless communication system, the network node comprising radio frequency circuitry, a processor and a memory, said memory containing instructions executable by said processor whereby said network node is operative to:
   receive uplink reference symbols transmitted by the wireless communication device at a sounding time;
   estimate a channel response based on the received reference symbols;
   determine a plurality of uncertainty regions of the channel response at a corresponding plurality of time delays subsequent to the sounding time for transmissions on downlinks corresponding to the uplink in which the reference symbols are received, the uncertainty regions being based on an estimated velocity of the wireless communication device and based on assumed phase-only changes of the channel response;
   calculate precoding weights for the downlink transmissions using the estimated uncertainty regions of the channel responses; and
   transmit downlink signals to the wireless communication device, said transmitting comprising precoding using the calculated precoding weights.

9. The network node of claim 8, wherein said instructions are such that the network node is operative to map the plurality of antennas on a plurality of transmit ports and operative such that:
   the determination of the uncertainty regions of the channel response and the calculation of precoding weights comprise an assumption of statistically independent phase-only uncertainty per transmit port.

10. The network node of claim 9, wherein said instructions are such that the network node is operative so that:
   the calculation of precoding weights comprises a minimum mean-squared error (MMSE) effective channel calculation based on an assumption of statistically independent phase-only uncertainty per transmit port.

11. The network node of claim 8, wherein said instructions are such that the network node is operative to calculate the time delays as the difference between a current downlink sub-frame transmission time and the sounding time.

12. The network node of claim 8, wherein the time delays subsequent to the sounding time are prior to a second sounding time that is subsequent to the sounding time.

13. The network node of claim 8, wherein said instructions are such that the network node is operative to estimate the velocity of the wireless device from any of:
   a Doppler shift of a radio frequency signal transmitted by the wireless communication device and received by the network node; and
   predetermined velocity information obtained by the network node.

14. The network node of claim 8, wherein said instructions are such that the network node is operative in either or both of:
   a third generation partnership project (3GPP) long term evolution (LTE) system wherein the reference symbols transmitted by the wireless communication device are sounding reference symbols (SRS); and
   a 3GPP new radio (NR) system wherein the reference symbols transmitted by the wireless communication device are NR sounding reference symbols (NR SRS).

15. A non-transitory computer-readable medium comprising, stored thereupon, a computer program comprising instructions which, when executed on at least one processor in a network node, cause the network node to:
   receive uplink reference symbols transmitted by the wireless communication device at a sounding time;
   estimate a channel response based on the received reference symbols;
   determine a plurality of uncertainty regions of the channel response at a corresponding plurality of time delays subsequent to the sounding time for transmissions on downlinks corresponding to the uplink in which the reference symbols are received, the uncertainty regions being based on an estimated velocity of the wireless communication device and based on assumed phase-only changes of the channel response;
   calculate precoding weights for downlink transmissions via a plurality of antennas, using the estimated uncertainty regions of the channel responses; and
   transmitting downlink signals to a wireless communication device in a wireless communication system, using the plurality of antennas, said transmitting comprising precoding using the calculated precoding weights.

* * * * *